United States Patent
Ide et al.

(10) Patent No.: US 9,625,354 B2
(45) Date of Patent: Apr. 18, 2017

(54) DETECTING OCCURRENCE OF ABNORMALITY

(75) Inventors: Tsuyoshi Ide, Kanagawa-ken (JP); Tetsuro Morimura, Tokyo (JP)

(73) Assignee: GLOBALFOUNDRIES INC., Grand Cayman, KY (US)

(*) Notice: Subject to any disclaimer, the term of this patent is extended or adjusted under 35 U.S.C. 154(b) by 603 days.

(21) Appl. No.: 14/345,415

(22) PCT Filed: Jul. 27, 2012

(86) PCT No.: PCT/JP2012/069179
§ 371 (c)(1),
(2), (4) Date: Aug. 4, 2014

(87) PCT Pub. No.: WO2013/042455
PCT Pub. Date: Mar. 28, 2013

(65) Prior Publication Data
US 2014/0336985 A1    Nov. 13, 2014

(30) Foreign Application Priority Data

Sep. 21, 2011    (JP) ................................ 2011-206087

(51) Int. Cl.
*G06F 11/30* (2006.01)
*G01M 99/00* (2011.01)
(Continued)

(52) U.S. Cl.
CPC .......... *G01M 99/008* (2013.01); *G06Q 10/06* (2013.01); *G06Q 10/20* (2013.01); *G07C 5/0808* (2013.01)

(58) Field of Classification Search
CPC .. G06F 17/18; G06K 9/00536; G06K 9/6284; G06Q 10/06; G06Q 10/20; G07C 5/0808
(Continued)

(56) References Cited

U.S. PATENT DOCUMENTS

| | | | |
|---|---|---|---|
| 7,483,934 B1* | 1/2009 | Ide ..................... | G06K 9/00979 708/422 |
| 9,495,330 B2* | 11/2016 | Ide ......................... | G06F 17/18 |
| 2015/0339265 A1* | 11/2015 | Thibaux ................. | G06F 17/18 702/179 |

FOREIGN PATENT DOCUMENTS

| | | |
|---|---|---|
| JP | 2009-070071 A | 4/2009 |
| JP | 2009-075081 A | 4/2009 |

(Continued)

OTHER PUBLICATIONS

Banerjee et al., "Convex optimization techniques for fitting sparse Gaussian graphical models", 2006 Proc. of 23rd Intl Conf. on Machine Learning, pp. 89-96.

(Continued)

*Primary Examiner* — An Do
(74) *Attorney, Agent, or Firm* — Scully Scott Murphy and Presser; Frank Digiglio

(57) ABSTRACT

A method, apparatus and computer program for detecting occurrence of an anomaly. The method can exclude arbitrariness and objectively judge whether a variation of a physical quantity to be detected is abnormal or not even when an external environment is fluctuating. The method includes acquiring multiple primary measurement values from a measurement target. Further, calculating and a reference value for each of the multiple primary measurement values by optimal learning. The method further includes calculating a relationship matrix which indicates mutual relationships between the multiple secondary measurement values. Further the method includes calculating an anomaly score for each of the secondary measurement value which indicates the degree of the measurement target being abnormal. The anomaly score is calculated by comparing the secondary measurement value with a predictive value which (Continued)

is calculated based on the relationship matrix and other secondary measurement values.

17 Claims, 4 Drawing Sheets

(51) Int. Cl.
 *G06Q 10/00* (2012.01)
 *G06Q 10/06* (2012.01)
 *G07C 5/08* (2006.01)
(58) Field of Classification Search
 USPC .......................................... 702/127, 182–185
 See application file for complete search history.

(56) References Cited

FOREIGN PATENT DOCUMENTS

| | | |
|---|---|---|
| JP | 2010-078467 A | 4/2010 |
| JP | 2010-179706 A | 8/2010 |

OTHER PUBLICATIONS

Ide et al., "Change-point detection and failure Analysis of sensor data using sparse structure leaning" Provision, May 2010, No. 65, 21 p. 71-76.
Makino et al., "The Proposal of Anomaly Detection System by Statistical Method about Monitoring System of Railway" Japan Society of Mech Engs Ann.Meet , 2008, v.6, p. 359-60.
Wakabayashi et al., "Diagnostic System Utilizing the Fluctuated Detector Signals" Kyoto Univ, Research Reactor Inst. Technical Rep. TR-Kurri No. 203, 1980, pp. 61-69.

\* cited by examiner

DETECTING OCCURRENCE OF ABNORMALITY

CROSS-REFERENCE TO RELATED APPLICATION

This application claims priority under 35 U.S.C. 371 from PCT Application, PCT/JP2012/069179, filed on Jul. 27, 2012, which claims priority from the Japanese Patent Application No. 2011-206087, filed on Sep. 21, 2011. The entire contents of both applications are incorporated herein by reference.

FIELD OF THE INVENTION

The present invention relates to a method, apparatus and computer program for early and certainly detecting occurrence of an anomaly even when an external environment is fluctuating.

BACKGROUND OF THE INVENTION

For safe operation of an infrastructure that can have a grave influence on the society in the event of an accident, precise monitoring of the status of industrial machines is highly important. For example, a conventional anomaly detection system for a transport vehicle detects occurrence of an abnormality by obtaining various measurements with sensors during running.

However, the conventional anomaly detection system does not directly measure a measurement target such as a transformer, a resistor, a wheel, an electric motor and a gear but indirectly obtains measurements of the measurement target through calculation from measurements of surroundings of the measurement target. Consequently, the conventional anomaly detection system is easily affected by an environmental factor such as the running pattern and the meteorological condition and can hardly grasp the accurate measurement variation by excluding the influence of the environment.

Japanese Patent JP2010-179706A describes an anomaly detection system that judges whether a variation of a measurement value is abnormal or not by calculating a representative value of surface measurement values of a measurement target under the same condition and comparing the measurement value with the representative value under the same condition. The anomaly detection system disclosed in Japanese Patent JP2010-179706A can detect occurrence of an abnormality based only on the measurement value variation caused by the occurrence of the abnormality by excluding the influence of the ambient environment by designating, as a representative value, a value determined based on a measurement value variation that normally occurs and subtracting the representative value from each measurement value under the same condition.

However, variation that is detected is not limited to change in temperature. In order to detect occurrence of an abnormality, it is especially important to stably detect the variation even when an external environment is fluctuating.

The present invention has been made in view of the above situation, and the object is to provide a method, apparatus and computer program for detecting occurrence of an abnormality that make it possible to more objectively judge whether fluctuation of the physical quantity of a detection target is abnormal or not even when an external environment is fluctuating.

SUMMARY OF THE INVENTION

One aspect of the present invention provides a method for detecting occurrence of an abnormality in a measurement target, the method includes: acquiring multiple primary measurement values from the measurement target; calculating multiple reference values so that a reference value is calculated for each primary measurement value using optimal learning; calculating multiple secondary measurement values with the multiple primary measurement values and the corresponding multiple reference values, wherein the multiple secondary measurement values are calculated by subtracting the corresponding multiple reference values from the multiple primary measurement values; calculating a relationship matrix indicating a plurality of mutual relationships among the calculated multiple secondary measurement values; and calculating an anomaly score for each of the secondary measurement values which indicates the degree of the measurement target is abnormal by comparing a predictive value with the secondary measurement value, wherein the predictive value is calculated based on the relationship matrix and other multiple secondary measurement values.

The second aspect of the present invention provides an apparatus that detects whether an abnormality has occurred in a measurement target. The apparatus includes a primary measurement value acquisition means for acquiring multiple primary measurement values from the measurement target; reference value calculation means for calculating multiple reference values so that a reference value is calculated for each primary measurement value using optimal learning; secondary measurement value calculation means for calculating multiple secondary measurement values with the multiple primary measurement values and the corresponding multiple reference values, wherein the multiple secondary measurement values are calculated by subtracting the corresponding reference values from the multiple primary measurement values; relationship matrix calculation means for calculating a relationship matrix indicating a plurality of mutual relationships among the calculated multiple secondary measurement values; and anomaly score calculation means for calculating an anomaly score for each secondary measurement value, which indicates the degree of the measurement target being abnormal by comparing a predictive value with the secondary measurement value, wherein the predictive value is calculated based on the calculated relationship matrix and other multiple secondary measurement values.

The third aspect of the present invention provides a computer readable non-transitory article of manufacture tangibly embodying computer readable instruction which, when executed, cause a computer to carry out the steps of a method according to the first aspect of the present invention.

DETAILED DESCRIPTION OF THE PREFERRED EMBODIMENTS

Figure 1:
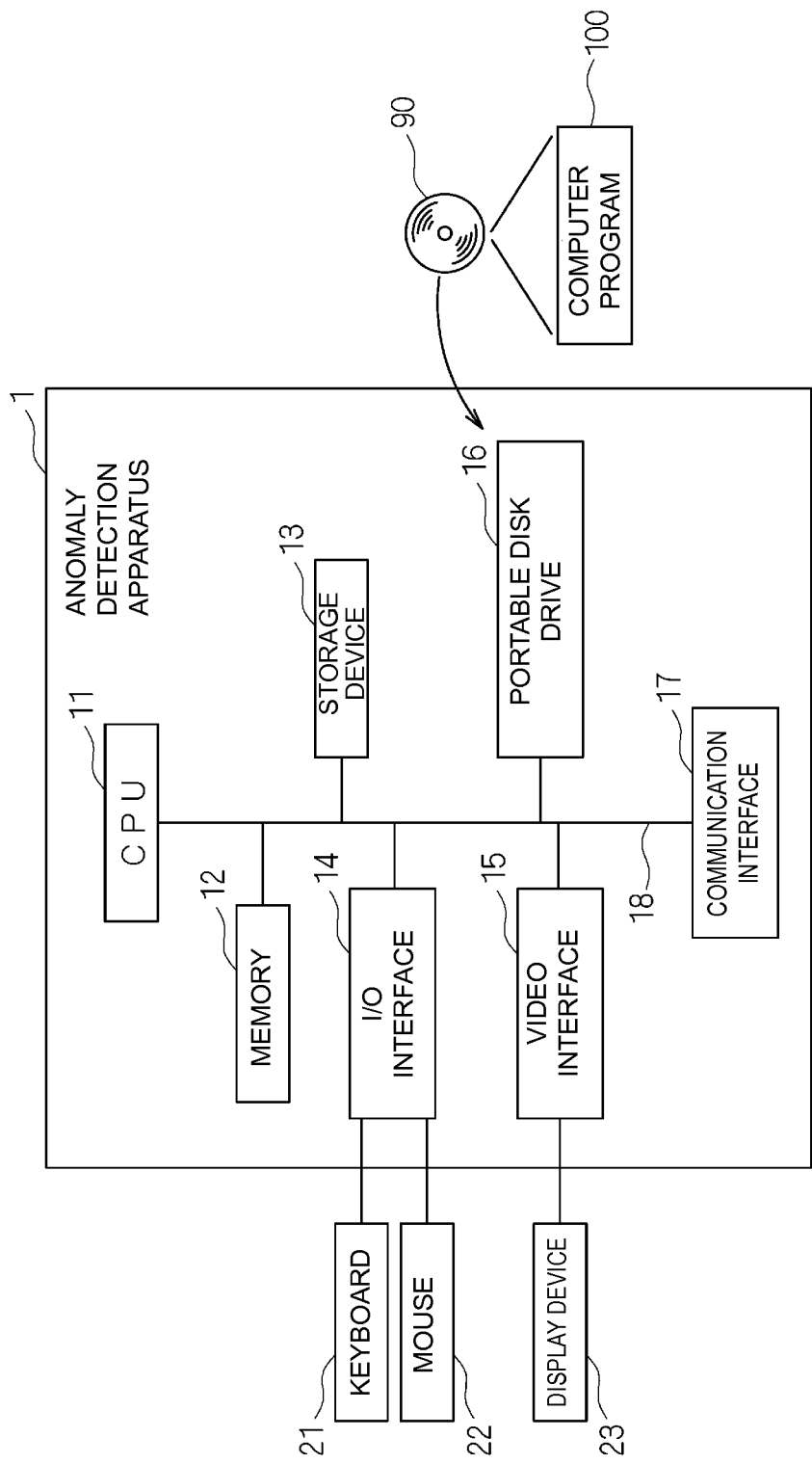
FIG. 1 is a schematic block diagram showing a configuration of an abnormality detecting apparatus according to an embodiment of the present invention.

In the following, an apparatus that early and certainly detects occurrence of an abnormality even when an external environment is fluctuating according to an embodiment of the present invention will be specifically described with reference to the drawings. Of course, the embodiment described below is not intended to limit in any sense the present invention described in the Claims, and all the combinations of the features described with regard to the embodiment are not always essential for the solution to the problems.

The present invention can have many other embodiments and should not be construed as being limited to the specific embodiment described herein. In the embodiment described below, the same components are denoted by the same reference numerals.

Although an apparatus according to the embodiment described below is implemented by a computer system having a computer program installed therein, it will be apparent to those skilled in the art that the present invention can be embodied as a computer program a part of which can be executed by a computer. That is, the present invention can be implemented in the form of hardware, that is, the apparatus that early and certainly detects occurrence of an abnormality even when an external environment is fluctuating, in the form of software, or in the form of a combination of software and hardware. The computer program can be recorded in a recording medium readable by any computer, such as a hard disk, a DVD, a CD, an optical storage device, and a magnetic storage device.

According to the embodiment of the present invention, a permanent feature of a primary measurement value is extracted as a reference value from the primary measurement value, and a variable set that includes, as a variable, a secondary measurement value that is the result of subtracting the reference value from the primary measurement value is determined by optimal learning. Since the anomaly score can be calculated by comparing the secondary measurement value with a predictive value, the reference value can be objectively determined, and the anomaly score can be calculated by calculating the variable set by optimal learning. Therefore, even when the external environment is fluctuating, whether a variation of a physical quantity of a detection target is abnormal or not can be objectively judged by excluding a variation caused by the fluctuation of the external environment and excluding an arbitrariness.

FIG. 1 is a schematic block diagram showing a configuration of an abnormality detecting apparatus according to the embodiment of the present invention. An abnormality detecting apparatus 1 according to this embodiment of the present invention includes at least a central processing unit (CPU) 11, a memory 12, a storage device 13, an I/O interface 14, a video interface 15, a portable disk drive 16, a communication interface 17, and an internal bus 18 that interconnects the hardware components described above.

The CPU 11 is connected to the above-described hardware components of the abnormality detecting apparatus 1 by the internal bus 18, and controls the operations of the hardware components, and performs various software functions according to a computer program 100 stored in the storage device 13. The memory 12 is a volatile memory such as an SRAM and an SDRAM. When the computer program 100 is executed, a load module is developed in the memory 12, and temporary data or the like produced during execution of the computer program 100 is stored in the memory 12.

The storage device 13 is a fixed storage device (hard disk), a ROM or the like incorporated in the abnormality detecting apparatus. The computer program 100 stored in the storage device 13 is downloaded from a portable recording medium 90 such as a DVD and a CD-ROM, in which information such as a program and data is recorded, by the portable disk drive 16 and developed from the storage device 13 into the memory 12 for execution. The computer program can be downloaded from an external computer connected to the abnormality detecting apparatus via the communication interface 17.

The communication interface 17 is connected to the internal bus 18 and connected to an external network such as the Internet, a LAN and a WAN to enable data transmission to and reception from an external computer or the like.

The I/O interface 14 is connected to an input device such as a keyboard 21 and a mouse 22 and accepts a data input. The video interface 15 is connected to a display device 23 such as a CRT display and a liquid crystal display and enables display of a predetermined image.

Figure 2:
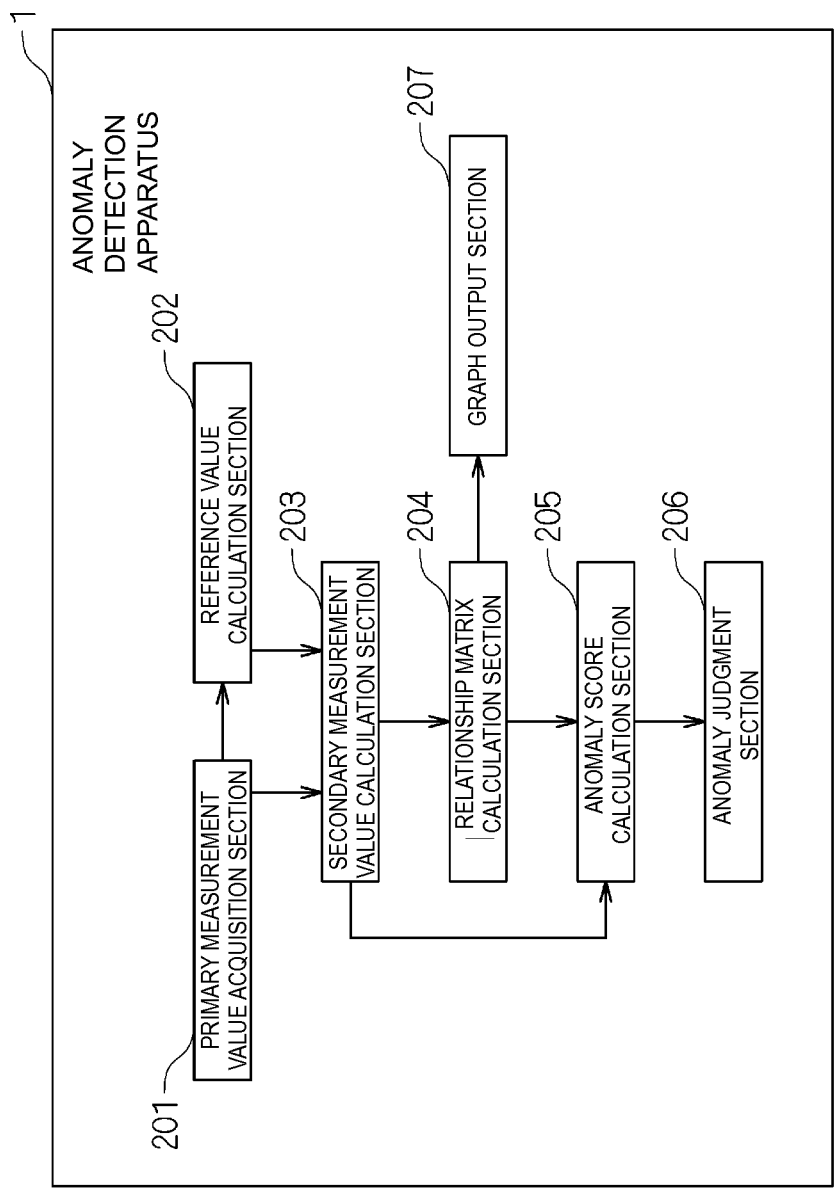
FIG. 2 is a functional block diagram showing the abnormality detecting apparatus according to the embodiment of the present invention.

FIG. 2 is a functional block diagram showing the abnormality detecting apparatus 1 according to the embodiment of the present invention. In FIG. 2, a primary measurement value acquisition section 201 of the abnormality detecting apparatus 1 acquires multiple primary measurement values from a measurement target. The primary measurement value is a physical quantity acquired from the measurement target with a sensor or the like and is the temperature of an axle box of a railway vehicle detected by a temperature sensor, for example. The physical quantity is not especially limited to temperature, but any physical quantity can be used which can be stably measured even when the external environment is fluctuating.

A reference value calculation section 202 calculates a reference value for each of the acquired multiple primary measurement values by optimal learning. More specifically, for a vector x of the primary measurement values composed of M elements (M denotes a natural number), reference values for determining secondary measurement values, which are the results of subtracting the reference values from their corresponding primary measurement values by using a projection matrix W, are calculated by optimal learning.

In this embodiment, the reference values are expressed as a linear combination (linear mapping) of a set $\{W_i\}$ of d orthonormal base vectors (projection vectors) $W_i$ (d denotes a natural number), and the base is determined in an optimal manner. The word "optimal" used here means that the degree of matching to a normally expected variation direction is at the maximum and that the projection element of a normal sample $\{x^{(1)}, \ldots, x^{(N)}\}$ is maximized. That is, provided that the projection matrix W is expressed using the projection vector $W_i$ as $W=[W_1, \ldots, W_d]$, a formula for determining the secondary measurement value on the basis of the primary measurement value can be expressed as the following formula (1).

Formula 1

$$x \leftarrow (I - WW^T)x \quad \text{(Formula 1)}$$

In this formula, a matrix $W^T$ denotes a transposed matrix of the projection matrix W, the vector x denotes a physical quantity vector, and a vector I denotes a unit matrix. Therefore, optimizing the projection matrix W so as to maximize the projection element of the normal sample in terms of the projection matrix W is equivalent to calculating the reference value.

A formula defined to maximize the projection element of the normal sample of the projection matrix W can be expressed as the following formula (2).

Formula 2

$$W = \underset{W}{\operatorname{argmax}}: \sum_{n=1}^{N} \sum_{i=1}^{d} (w_i^T x^{(n)})^2 \quad \text{(Formula 2)}$$

where $w_i^T w_j = \delta_{i,j}$

In this formula, $\delta_{i,j}$ denotes the Kronecker delta. The optimization problem can be rewritten as the following formula (3) by differentiating the formula (2). In the formula (3), Tr denotes the sum of diagonal elements of a matrix.

Formula 3

$$\frac{\partial}{\partial W}\{Tr(W^T SW) - Tr(W^T RW)\} = 0 \quad \text{(Formula 3)}$$

where $S_{i,j} \equiv \frac{1}{N}\sum_{n=1}^{N} x_i^{(n)} x_j^{(n)}$, $R_{i,j} = \delta_{i,j}\sigma_i$ Sorting out the formula (3) shows that a column vector of the projection matrix W agrees with an eigenvector of a matrix S as shown by the formula (4). Therefore, the reference values can be determined by selecting d eigenvectors with the larger eigenvalues.

Formula 4

$$0 = \frac{\partial}{\partial W}\{Tr(W^T SW) - Tr(W^T RW)\} = 2(SW - WR) \quad \text{(Formula 4)}$$

$Sw_i = \sigma_i w_i, i = 1, \ldots, d$

A secondary measurement value calculation section 203 calculates, with the acquired multiple primary measurement values and the multiple corresponding reference values, multiple secondary measurement values by subtracting the reference values from their corresponding primary measurement values. More specifically, M secondary measurement values are calculated by subtracting (WW$^T$x), which are calculated as M reference values determined by the projection matrix W composed of d eigenvectors, from the vector x of the primary measurement values composed of M elements.

Figure 3:
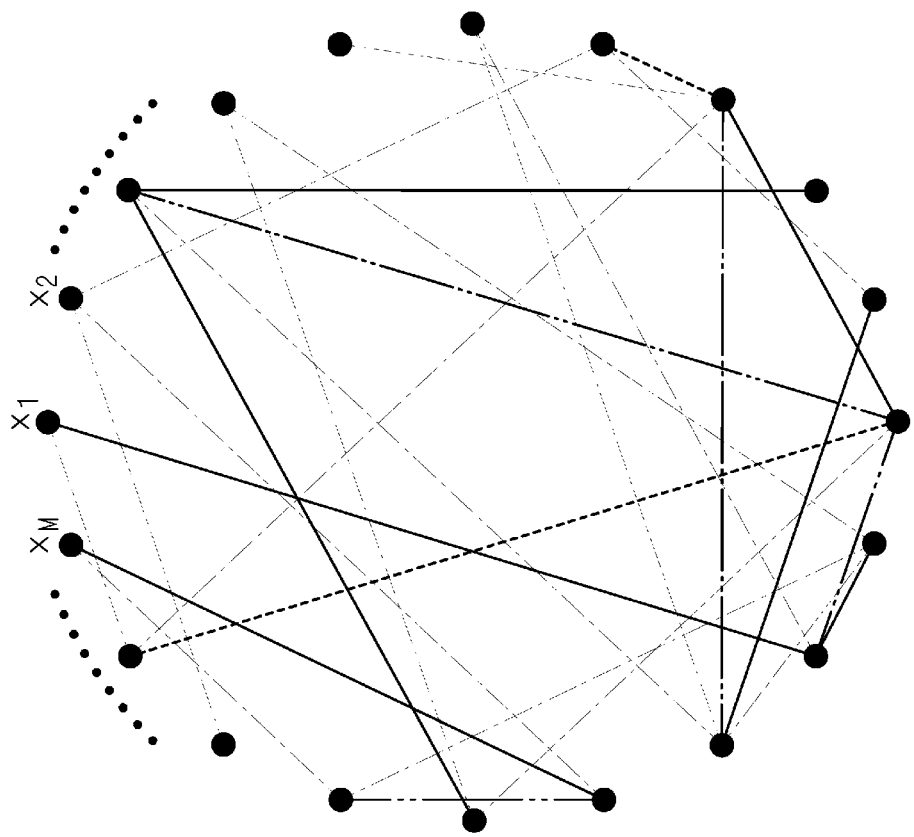
FIG. 3 is a diagram illustrating a graph showing a relationship in a variable set used by the abnormality detecting apparatus according to the embodiment of the present invention.

A relationship matrix calculation section 204 calculates a relationship matrix that indicates a mutual relationship among the calculated multiple secondary measurement values. The calculation of the relationship matrix can be attributed to a problem of determining, by optimal learning, a variable set that includes the secondary measurement values as variables In this embodiment, the problem of determining the variable set is attributed to a graph identification problem. That is, a graph that indicates a relationship in the variable set is determined, and an adjacency matrix Λ is calculated from the graph. FIG. 3 is a diagram showing an example of the graph that indicates a relationship in a variable set used by the abnormality detecting apparatus 1 according to this embodiment of the present invention.

In the example shown in FIG. 3, the graph shows how strongly each secondary measurement value indicating the temperature of the axle box of the railway vehicle is related with the other secondary measurement values. Different kinds of lines show different levels of strength of the relationship between two of the secondary measurement values $x_1$ to $x_M$. For example, a solid line, an alternate long and short dash line, an alternate long and two short dash lines, and a broken line can indicate different levels of strength of the relationship: the strength of the relationship decreases in this order. As an alternative, of course, the strength of the relationship may be indicated by the color of each line or by the thickness, the color and the kind of each line in combination. To calculate the adjacency matrix Λ from the graph shown in FIG. 3, maximum aposteriori probability estimation of a normal distribution using a Laplace prior distribution is performed.

First, as a preparation for the optimal learning, the secondary measurement values are standardized to have an average of 0 and a variance of 1. Then, a matrix expression of the optimization problem for the adjacency matrix Λ is as shown by the following formula (5). In the formula (5), N (x|average, covariance matrix) denotes a normal distribution of x.

Formula 5

$$\Lambda = \underset{\Lambda}{\operatorname{argmax}} \ln\left[\prod_{n=1}^{N} N(x^{(n)} \mid 0, \Lambda^{-1})\right] \prod_{i=1}^{M} \prod_{j=1}^{M} e^{-\rho|\Lambda_{i,j}|} \quad \text{(Formula 5)}$$

$$\Lambda = \underset{\Lambda}{\operatorname{argmax}}\left\{\ln \det \Lambda - tr\left(\sum \Lambda\right) - \rho \sum_{i,j=1}^{M} |\Lambda_{i,j}|\right\}$$

where $\sum_{i,j} \equiv \frac{1}{N}\sum_{n=1}^{N} x_i^{(n)} x_j^{(n)}$

The adjacency matrix Λ is solved by expressing it as a weighted adjacency matrix and performing maximum aposteriori probability estimation of a normal distribution using a Laplace prior distribution. A method of solving the adjacency matrix Λ is described in "Convex optimization techniques for fitting sparse Gaussian graphical models", Banerjee et al., Proceedings of the 23$^{rd}$ international conference on Machine Learning, pp. 89-96, 2006.

The absolute value of the weight of the weighted adjacency matrix Λ determined by the formula (5) increases as the strength of the relationship among the secondary measurement values increases, and the weight is zero when there is no relationship among the secondary measurement values. This is because the secondary measurement values are standardized to have an average of 0 and a variance of 1.

An abnormality degree calculation section 205 calculates, for each secondary measurement value, the anomaly score that indicates the degree of the measurement target being abnormal by comparing the secondary measurement value with a predictive value, which is calculated on the basis of the calculated relationship matrix and the other secondary measurement values. The predictive value is calculated for each secondary measurement value by using a logarithmic loss according to a conditional distribution given the other secondary measurement values.

More specifically, the calculation occurs in the procedure described below. First, a probability distribution p(x) of the vector x of the secondary measurement values can be expressed by the following formula (6) by using the adjacency matrix Λ.

Formula 6

$$p(x) \equiv \frac{\det|\Lambda|^{\frac{1}{2}}}{(2\pi)^{\frac{M}{2}}} \exp\left(-\frac{1}{2} x^T \Lambda^{\frac{1}{2}} x\right) \quad \text{(Formula 6)}$$

Then, the anomaly score is defined as the following formula (7) by calculating a conditional distribution for each variable (secondary measurement value).

Formula 7

$$\begin{aligned}
&(\text{abnormality of first variable}) = \\
&\quad -\log p(x_1 \mid x_2, x_3, x_4, \ldots x_M) \\
&(\text{abnormality of second variable}) = \\
&\quad -\log p(x_2 \mid x_1, x_3, x_4, \ldots x_M) \\
&\ldots \\
&(\text{abnormality of } M\text{-}th \text{ variable}) = \\
&\quad -\log p(x_M \mid x_1, x_2, x_3, \ldots x_{M-1})
\end{aligned} \quad \text{(Formula 7)}$$

As described in formula (7), if the value of one variable of the vector x of the secondary measurement values determined for a learnt probability model deviates from a value predicted from the values of the other variables and the adjacency matrix Λ, the calculated anomaly score of the one variable assumes a large value. For example, the conditional distribution p for the secondary measurement value $x_1$ can be expressed by the following formula (8).

Formula 8

$$p(x_1 \mid x_2, \ldots, x_M) = N\left(x_1 \mid -\frac{1}{\Lambda_{1,1}} \sum_{i=2}^{M} \Lambda_{1,i} x_i, \frac{1}{\Lambda_{1,1}}\right) \quad \text{(Formula 8)}$$

The anomaly score $s_1$ can be determined as an M-dimensional vector as with the secondary measurement values according to the following formula (9) by substituting the definition of the normal distribution into the formula (8) and sorting out the resulting formula.

Formula 9

$$s_1 = \frac{1}{2} \ln \frac{2\pi}{\Lambda_{1,1}} + \frac{1}{2\Lambda_{1,1}} \left( \sum_{i=1}^{M} \Lambda_{1,i} x_i \right)^2 \quad \text{(Formula 9)}$$

Since the anomaly score needs to be calculated in the same number as the measurement targets, the abnormality degree vector s of an equal dimension is calculated for the vector x of the secondary measurement values. According to the formula (9), the deviation of the value of the physical quantity of a measurement target from a value expected when the values of the physical quantity of the other measurement targets are given as variables is calculated in terms of information theory.

An abnormality judgment section 206 judges whether or not the calculated anomaly score, or in other words, the degree of deviation of the secondary measurement value is greater than a predetermined value. If the anomaly score is greater than the predetermined value, it can be judged that an abnormality has occurred.

The graph indicating the relationship in the variable set may be output to and displayed on the display device 23, for example. A graph output section 207 outputs the graph to the display device 23 for display.

Figure 4:
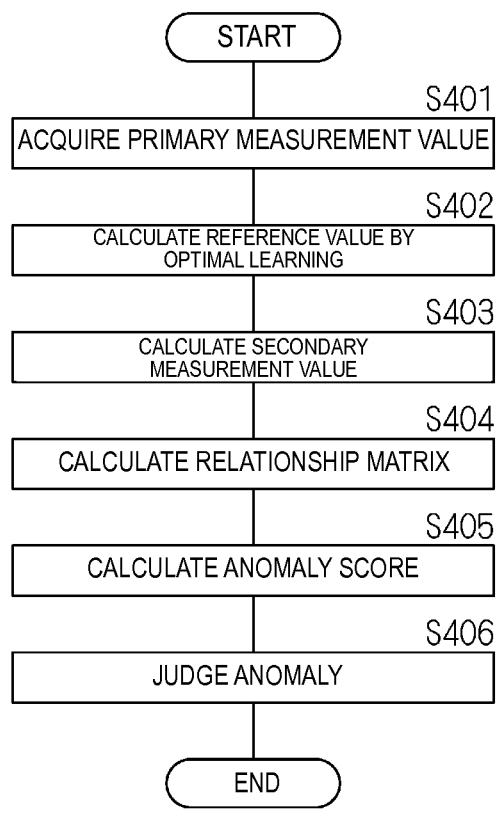
FIG. 4 is a flowchart showing a flow of a process performed by a CPU of the abnormality detecting apparatus according to this embodiment of the present invention.

FIG. 4 is a flowchart showing a flow of a process performed by the CPU 11 of the abnormality detecting apparatus 1 according to this embodiment of the present invention. In FIG. 4, the CPU 11 of the abnormality detecting apparatus 1 acquires multiple primary measurement values from a measurement target (Step S401). The primary measurement value is a physical quantity acquired from a measurement target with a sensor or the like and is the temperature of an axle box of a railway vehicle detected by a temperature sensor, for example. The physical quantity is not especially limited to temperature, but any physical quantity can be used which can be stably measured even when the external environment is fluctuating.

The CPU 11 calculates a reference value for each of the acquired multiple primary measurement values by optimal learning (Step S402). More specifically, for a vector x of the primary measurement values composed of M elements (M denotes a natural number), reference values for determining secondary measurement values, which are the results of subtracting the reference values from their corresponding primary measurement values by using a projection matrix W, are calculated by optimal learning.

With the acquired multiple primary measurement values and the multiple corresponding reference values, the CPU 11 calculates multiple secondary measurement values by subtracting the reference values from their corresponding primary measurement values (Step S403). More specifically, M secondary measurement values are calculated by subtracting (WW$^T$x), which are calculated as M reference values determined by the projection matrix W composed of d eigenvectors, from the vector x of the primary measurement values composed of M elements.

The CPU 11 calculates a relationship matrix that indicates a mutual relationship among the calculated multiple secondary measurement values (Step S404). The calculation of the relationship matrix can be attributed to a problem of determining, by optimal learning, a variable set that includes the secondary measurement values as variables.

In this embodiment, the problem of determining the variable set is attributed to a graph identification problem. That is, an optimal variable set for calculating the anomaly score, that is, an optimal combination of secondary measurement values for calculating the physical quantity expected in the normal state can be determined by determining a graph that indicates a relationship in the variable set and calculating an adjacency matrix Λ from the graph.

For each secondary measurement value, the CPU 11 calculates the anomaly score that indicates the degree of the measurement target being abnormal by comparing the secondary measurement value with a predictive value, which is calculated on the basis of the calculated relationship matrix and the other secondary measurement values (Step S405). The predictive value is calculated for each secondary measurement value by using a logarithmic loss according to a conditional distribution given the other secondary measurement values.

According to another embodiment of the present invention the reference value is calculated by using a linear mapping maximizing a projection element of a normal sample in terms of a projection matrix.

According to another embodiment of the present invention the relationship matrix is calculated by calculating a weighted adjacency matrix from a graph indicating a relationship among the secondary measurement values and performing maximum aposteriori probability estimation of a normal distribution using a Laplace prior distribution.

According to another embodiment of the present invention the absolute value of a weight of the weighted adjacency matrix increases as the strength of the relationship among the secondary measurement values increases, and the weight is zero when there is no relationship among the secondary measurement values.

According to another embodiment of the present invention includes outputting the graph.

The According to another embodiment of the present invention the predictive value is calculated for each secondary measurement value by using a logarithmic loss according to a conditional distribution given the other secondary measurement values.

According to the present invention, a permanent feature of a primary measurement value is extracted as a reference value from the primary measurement value, and a variable set that includes, as a variable, a secondary measurement value that is the result of subtracting the reference value from the primary measurement value is determined by optimal learning. Since the anomaly score can be calculated by comparing the secondary measurement value with a predictive value, the reference value can be objectively determined, and the anomaly score can be calculated by calculating the variable set by optimal learning. Therefore, even when the external environment is fluctuating, whether a variation of a physical quantity of a detection target is abnormal or not can be objectively judged by excluding a variation caused by the fluctuation of the external environment and excluding an arbitrariness.

The CPU 11 judges whether or not the calculated anomaly score, or in other words, the degree of deviation of the secondary measurement value is greater than a predetermined value (Step S406). If the anomaly score is greater than the predetermined value, it can be judged that an abnormality has occurred.

As described above, according to this embodiment, a permanent feature of a primary measurement value is extracted as a reference value from the primary measurement value, and a variable set that includes, as a variable, a secondary measurement value that is the result of subtracting the reference value from the primary measurement value is determined by optimal learning. Since the anomaly score can be calculated by comparing the secondary measurement value with a predictive value, the reference value can be objectively determined, and the anomaly score can be calculated by calculating the variable set by optimal learning. Therefore, even when the external environment is fluctuating, whether a variation of a physical quantity of a detection target is abnormal or not can be objectively judged by excluding a variation caused by the fluctuation of the external environment and excluding an arbitrariness.

The present invention is not limited to the embodiment described above, and various modifications, alterations and the like can be made without departing from the spirit and scope of the present invention. If the primary measurement value is a physical quantity that can substantially vary when an abnormality occurs, such as the temperature of an axle box of a railway vehicle, the present invention can precisely detect occurrence of a less detectable abnormality.

The invention claimed is:

1. A method for detecting an occurrence of an abnormality in a measurement target, the method comprising:
   acquiring multiple primary measurement values from the measurement target;
   calculating multiple reference values so that a reference value is calculated for each primary measurement value using optimal learning;
   calculating multiple secondary measurement values with the multiple primary measurement values and the corresponding multiple reference values, wherein the multiple secondary measurement values are calculated by subtracting the corresponding multiple reference values from the multiple primary measurement values;
   calculating a relationship matrix indicating a plurality of mutual relationships among the multiple secondary measurement values; and
   calculating an anomaly score for each secondary measurement value, which indicates the degree the measurement target is abnormal by comparing a predictive value with the secondary measurement value, wherein the predictive value is calculated based on the relationship matrix and other multiple secondary measurement values.

2. The method according to claim 1, wherein said reference value is calculated by using a linear mapping and maximizing a projection element of a normal sample in terms of a projection matrix.

3. The method according to claim 1, wherein said relationship matrix is calculated by calculating a weighted adjacency matrix from a graph indicating a relationship among said multiple secondary measurement values and performing maximum aposteriori probability estimation of a normal distribution using a Laplace prior distribution.

4. The method according to claim 3, wherein:
   the absolute value of a weight of said weighted adjacency matrix increases as the strength of the relationship among said multiple secondary measurement values increases; and
   the weight is zero when there is no relationship among the multiple secondary measurement values.

5. The method according to claim 3, further comprising outputting said graph.

6. The method according claim 1, wherein said predictive value is calculated for each secondary measurement value by using a logarithmic loss according to a conditional distribution of the other multiple secondary measurement values.

7. An apparatus that detects whether an abnormality has occurred in a measurement target, the apparatus comprising:
   primary measurement value acquisition means for acquiring multiple primary measurement values from the measurement target;
   reference value calculation means for calculating multiple reference values so that a reference value is calculated for each primary measurement value using optimal learning;
   secondary measurement value calculation means for calculating multiple secondary measurement values with the multiple primary measurement values and the corresponding multiple reference values, wherein the multiple secondary measurement values are calculated by subtracting the corresponding multiple reference values from the multiple primary measurement values;

relationship matrix calculation means for calculating a relationship matrix indicating a plurality of mutual relationships among the multiple secondary measurement values; and anomaly score calculation means for calculating an anomaly score for each secondary measurement value, which indicates the degree the measurement target is abnormal by comparing a predictive value with the secondary measurement value, wherein the predictive value is calculated based on the relationship matrix and the other multiple secondary measurement values.

8. The apparatus according to claim 7, wherein said reference value calculation means calculates said reference value by using a linear mapping and maximizing a projection element of a normal sample in terms of a projection matrix.

9. The apparatus according to claim 7, wherein said relationship matrix calculation means calculates said relationship matrix by calculating a weighted adjacency matrix from a graph which indicates a relationship among said multiple secondary measurement values and performing maximum aposteriori probability estimation of a normal distribution using a Laplace prior distribution.

10. The apparatus according to claim 9, wherein said relationship matrix calculation means configures said weighted adjacency matrix so that the absolute value of a weight of said weighted adjacency matrix increases as the strength of the relationship among said multiple secondary measurement values increases, and the weight is zero when there is no relationship among the secondary measurement values.

11. The apparatus according to claim 9, further comprising output means for outputting said graph.

12. The apparatus according to claim 7, wherein said abnormality degree calculation means calculates said predictive value for each secondary measurement value by using a logarithmic loss according to a conditional distribution of the other multiple secondary measurement values.

13. A computer readable non-transitory article of manufacture tangibly embodying computer readable instruction which, when executed, cause a computer to carry out the steps of a method, the method comprising:

acquiring multiple primary measurable values from the measurement target;

calculating multiple reference values so that a reference value for each primary measurement value using optimal learning;

calculating multiple secondary measurement values with the multiple primary measurement values and corresponding multiple reference values, wherein the multiple secondary values are calculated by subtracting the corresponding multiple reference values from the multiple primary measurement values;

calculating a relationship matrix indicating a plurality of mutual relationships among the multiple secondary measurement values; and calculating an anomaly score, for each secondary measurement value, which indicates the degree the measurement target is abnormal by comparing a predictive value with the secondary measurement value, wherein the predictive value is calculated based on the relationship matrix and other multiple secondary measurement values.

14. The computer according to claim 13, further comprising: calculating said reference value by using a linear mapping and maximizing a projection element of a normal sample in terms of a projection matrix.

15. The computer according to claim 13, wherein said relationship matrix is calculated by calculating a weighted adjacency matrix from a graph indicating a relationship among said multiple secondary measurement values and performing maximum aposteriori probability estimation of a normal distribution using a Laplace prior distribution.

16. The computer according to claim 15, further comprising outputting said graph.

17. The computer according to claim 13, wherein said predictive value is calculated for each secondary measurement value by using a logarithmic loss according to a conditional distribution of the other secondary measurement values.

* * * * *